(12) United States Patent
Butterwegge et al.

(10) Patent No.: US 11,582,580 B2
(45) Date of Patent: Feb. 14, 2023

(54) COMBINED INDOOR AND OUTDOOR TRACKING USING MACHINE LEARNING

(71) Applicant: Siemens Healthcare GmbH, Erlangen (DE)

(72) Inventors: Nicolas Butterwegge, Ober-Ramstadt (DE); Dmitrii Maltsev, Erlangen (DE); Felix Mueller, Buckenhof (DE); Gizem Okut, Nuremberg (DE); Fritz Schmid, Berg Bei Neumarkt In der Oberpfalz (DE); Winfried Schroeder, Forchheim (DE); Stefanie Schwartz, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/991,341

(22) Filed: Aug. 12, 2020

(65) Prior Publication Data
US 2021/0067914 A1 Mar. 4, 2021

(30) Foreign Application Priority Data

Aug. 27, 2019 (EP) .................................... 19193767

(51) Int. Cl.
*H04W 4/029* (2018.01)
*H04W 64/00* (2009.01)
(Continued)

(52) U.S. Cl.
CPC ........... *H04W 4/029* (2018.02); *G01S 5/0252* (2013.01); *G01S 13/86* (2013.01); *G06N 3/02* (2013.01); *H04W 64/00* (2013.01)

(58) Field of Classification Search
CPC .............................. H04W 4/029; H04W 64/00
(Continued)

(56) References Cited

U.S. PATENT DOCUMENTS

| 2007/0010956 A1* | 1/2007 | Nerguizian | ........... G01S 5/0273 |
| | | | 702/57 |
| 2012/0194552 A1* | 8/2012 | Osterhout | .......... G02B 27/0093 |
| | | | 345/633 |

(Continued)

FOREIGN PATENT DOCUMENTS

| CN | 105682022 A | 6/2016 |
| CN | 106908821 A | 6/2017 |

(Continued)

OTHER PUBLICATIONS

Box ID Systems GmbH, "Localization & Identification Systems for the Industrial Supply Chain", Box ID, Connecting Assets, https://www.bx-s.de/, 2019.

(Continued)

*Primary Examiner* — Joseph Arevalo
(74) *Attorney, Agent, or Firm* — Harness, Dickey & Pierce, P.L.C.

(57) ABSTRACT

A computer-implemented method for combined indoor and outdoor tracking using a tracking device is disclosed. In at least one embodiment of the method, a fingerprint of radio signals is generated by the device at a location to be determined. The location of the device is determined by applying trained functions to the fingerprint wherein the trained functions have been end-to-end trained using a plurality of fingerprints generated at known locations. Environmental sensor data may be used to predict a lifetime of a component tracked by the tracking device.

16 Claims, 4 Drawing Sheets

(51) Int. Cl.
*G01S 5/02* (2010.01)
*G01S 13/86* (2006.01)
*G06N 3/02* (2006.01)

(58) Field of Classification Search
USPC ... 455/456.1, 456.2, 456.6, 456.5, 434, 419, 455/437, 432.1, 418, 456.3
See application file for complete search history.

(56) References Cited

U.S. PATENT DOCUMENTS

| | | | | |
|---|---|---|---|---|
| 2013/0127980 | A1* | 5/2013 | Haddick | G02B 27/0093 348/14.08 |
| 2013/0278631 | A1* | 10/2013 | Border | G02C 5/143 345/633 |
| 2014/0241245 | A1* | 8/2014 | Berberana | H04W 24/02 370/328 |
| 2015/0268326 | A1* | 9/2015 | Sung | G01S 5/02 455/456.3 |
| 2016/0174075 | A1* | 6/2016 | Bolton | H04L 63/10 726/5 |
| 2019/0113632 | A1* | 4/2019 | Lucrecio | G01S 19/49 |
| 2019/0235092 | A1 | 8/2019 | Bastian, II et al. | |
| 2019/0348041 | A1* | 11/2019 | Cella | G06F 40/284 |
| 2020/0092034 | A1* | 3/2020 | Jones | H04L 5/0007 |
| 2020/0126033 | A1 | 4/2020 | Albrecht et al. | |
| 2020/0250391 | A1* | 8/2020 | Cao | G06F 3/041661 |

FOREIGN PATENT DOCUMENTS

| | | |
|---|---|---|
| WO | WO 2017211146 A1 | 12/2017 |
| WO | WO 2018118908 A1 | 6/2018 |

OTHER PUBLICATIONS

TIVE: "A Complete Supply Chain Visibility System", https://tive.co/product/, Apr. 23, 2019.
DHL: "Tracking Tools DHL Express", https://www.dhl.de/de/geschaeftskunden/express/verfolgen/tracking-tools.html, Apr. 23, 2019.
Viet-Cuong TA: "Smartphone-based indoor positioning using Wi-Fi, inertial sensors and Bluetooth"; XP055650302.
Roambee: "Real-time shipment tracking and asset monitoring—Global, on-demand goods and assents monitoring", https://www.roambee.com/, Apr. 23, 2019.
European Search Report for European Patent Application No. 19193767 dated Dec. 9, 2019.

* cited by examiner

COMBINED INDOOR AND OUTDOOR TRACKING USING MACHINE LEARNING

PRIORITY STATEMENT

The present application hereby claims priority under 35 U.S.C. § 119 to European patent application number EP 19193767.1 filed Aug. 27, 2019, the entire contents of which are hereby incorporated herein by reference.

TECHNICAL FIELD

Various example embodiments of the invention generally relate to localization of a device, specifically to tracking of a shipment in supply chain logistics. Various example embodiments particularly relate to combined indoor and outdoor tracking with a tracking device using radio signals and machine-learned (ML) algorithms.

BACKGROUND

In supply chain logistics, a typical transport route may include a plurality of different transport service providers, wherein only sparse information about the location and condition of a shipment may be made available by transportation service providers.

Several problems may therefore occur in conventional service/spare parts logistics. The transparency on transport routes of service/spare parts logistics may be unreliable or missing completely. For example, it may not be possible to see where a shipment is located, nor the condition of the goods within a shipment. Consequently, the status of the parcel may be unknown, wherein neither a condition of a spare part, e.g. a damage, nor the exact location, or time of handover at a destination of the shipment may be known.

Further, a shipment may be hard to find inside a building. For example, a service technician in a hospital, who depends and waits on a service part, may not know when the service part is available on site for installation, or may not know in which building, let alone exact room, of the hospital the shipment has been received and is stored. Accordingly, the technician may need a lot of time to determine the exact location, e.g. room, of a parcel inside a building, which may increase service costs for the hospital.

Furthermore, loss and damage of shipments may occur during shipment from a supplier to the hospital. For example, a spare part may arrive at the hospital (i.e. end customer), wherein a loss or damage has occurred on the way there, which may not be visible but may lead to decreased lifetime of the spare part.

Some of the problems have been solved by suppliers and service providers sending information on the location and delivery of shipments, which may be shipment data e.g. provided via an Electronic Data Interchange (EDI) standard. However, this information unfortunately often proves to be unreliable and untransparent. Existing solutions on the market for tracking parcels and shipments use a wide variety of sensors. Using GPS, it may be possible to track shipments outdoors and obtain an approximate time of arrival. Various transportation service providers offer shipment tracking on their homepage or via application. However, a reliable solution for the inside of buildings, e.g. inside tracking, is not available.

SUMMARY

The inventors have discovered that a need exists for advanced tracking techniques that overcome or mitigate at least some of the above-identified limitations and drawbacks.

Therefore, at least one embodiment of the presented approach provides an advanced method and system for determining a location of a device, which overcome or mitigate at least some the above-identified limitations and drawbacks.

In the following, embodiments of the invention are described with respect to the claimed methods for determining a location of a device as well as with respect to the claimed devices and systems for determining a location of a device. Features, advantages, or alternative embodiments herein may be assigned to the other embodiments and vice versa. In other words, claims and embodiments for the devices and systems may be improved with features described or claimed in the context of the methods. In this case, the functional features of the methods may be embodied by objective units of the devices or systems.

It is to be appreciated, that embodiments according to the invention is described with respect to methods and systems for determining a location of a device by applying trained functions as well as with respect to methods and systems for providing trained functions for determining a location of a device. Features, advantages, or alternative embodiments herein may be assigned to the other claimed objects and vice versa. In other words, claims for methods and systems for providing trained functions for determining a location of a device may be improved with features described or claimed in context of the methods and systems by applying trained functions, and vice versa.

Specifically, in the embodiments and claims related to applying trained functions, the trained functions may be improved with features described for the methods for providing trained functions. Likewise, input fingerprints may be improved with features described for the training fingerprints, and vice versa. Specifically, the environmental sensor data for determining a health condition of a component in a delivery comprising a device according to embodiments of the invention may be improved with features described for the environmental sensor training data, and vice versa. In particular, the trained functions of the methods and systems for determining a location of a device may be adapted by features of the methods and systems for providing trained functions for determining a location of a device. It will be appreciated that the described techniques can be used for determining a location of the device, or of a delivery including the device according to embodiments of the invention.

At least one embodiment is directed to a method, which may be a computer-implemented method, for determining a location of a device, comprising:

obtaining a fingerprint of radio signals, received by a device at a location to be determined; and determining the location of the device by applying trained functions to the fingerprint, which have been trained with training fingerprints, i.e. training data sets, of radio signals received at a plurality of known locations.

At least one embodiment is directed to a method, which may be a computer-implemented method, for providing trained functions for determining a location of a device, comprising:

receiving training fingerprints of radio signals received at a plurality of known locations;

generating, for each training fingerprint, a corresponding location;

determining a difference between the generated locations for the devices and the known locations of the devices;

training the functions using the determined difference; and providing the trained functions for determining the location of the device.

At least one embodiment is directed to a computer-implemented method for providing trained functions for determining a health condition of a device comprising:

receiving environmental sensor training data of each of a plurality of devices;

applying functions to the environmental sensor training data, wherein, for each device, a health condition is generated;

determining a difference between the generated health conditions and the known health conditions the components;

training the trainable functions based on the determined difference; and providing the trained functions for determining a health condition of a component.

At least one embodiment is directed to a computing device for determining a location of a field device, comprising:

a memory;

an interface; and at least one processing unit, the memory containing instructions executable by said at least one processing unit, wherein execution of the instructions causes the computing device to perform at least:

obtaining, by the computing device, a fingerprint of radio signals, received by the field device at a location to be determined determining, by the computing device, the location of the field device by applying trained functions to the fingerprint, wherein the trained functions were trained with training fingerprints of radio signals received at a plurality of known locations; and providing, by the computing device the determined location.

At least one embodiment is directed to a system, or tracking system, configured to perform any method of an embodiment for determining a location of a field device using trained functions, or providing trained functions for determining a location of a field device, according to the present disclosure. The system comprises at least one computing device and at least one field device according to the present disclosure.

At least one embodiment is directed to a non-transitory computer program product and a non-transitory computer-readable storage medium storing program code to be executed by at least one processor of a computing device. Therein, the execution of the program code in the at least one processor causes the computing device to carry out one of the methods of an embodiment for providing trained functions for determining a location of a device, or for determining a location of a device using trained functions, according to the present disclosure.

At least one embodiment is directed to a computer-implemented method for determining a location of a device, comprising:

obtaining a fingerprint of radio signals received by the device at a location to be determined;

determining the location of the device by applying trained functions to the fingerprint obtained, the trained functions being trained with training fingerprints of radio signals received at a plurality of known locations; and providing the location determined.

At least one embodiment is directed to a computer-implemented method for providing trained functions for determining a location of a device, comprising:

receiving training fingerprints of radio signals received at a plurality of known locations;

applying functions to the training fingerprints received, wherein for each respective training fingerprint of the training prints received, a respective location is generated;

determining a difference between the respective locations generated and the known locations;

training the functions based on the difference determined; and providing the trained functions for determining the location of the device.

At least one embodiment is directed to a computer-implemented method for providing trained functions for determining a health condition of a device, comprising:

receiving environmental sensor training data of each of a plurality of devices, each respective device of the plurality of devices including at least one environmental sensor, and each respective device including a respective known health condition;

applying functions to the environmental sensor training data received, wherein for each respective device, a respective health condition is generated;

determining a difference, for each respective device, between the health conditions generated and the known health conditions of the respective devices;

training the functions based on the differences determined; and providing the trained functions for determining the health condition of the device.

At least one embodiment is directed to a computing device configured for localization of a field device, the computing device comprising:

a memory;

an interface; and at least one processor, the memory storing instructions executable by the at least one processor, wherein execution of the instructions causes the computing device to execute at least:

obtaining a fingerprint of radio signals received by the field device at a location to be determined;

determining the location of the field device by applying trained functions to the fingerprint obtained, the trained functions being trained with training fingerprints of radio signals received at a plurality of known locations; and providing the location determined.

BRIEF DESCRIPTION OF THE DRAWINGS

In the following, concepts in accordance with example embodiments of the invention will be explained in more detail with reference to the following drawings.

DETAILED DESCRIPTION OF THE EXAMPLE EMBODIMENTS

Figure 1:
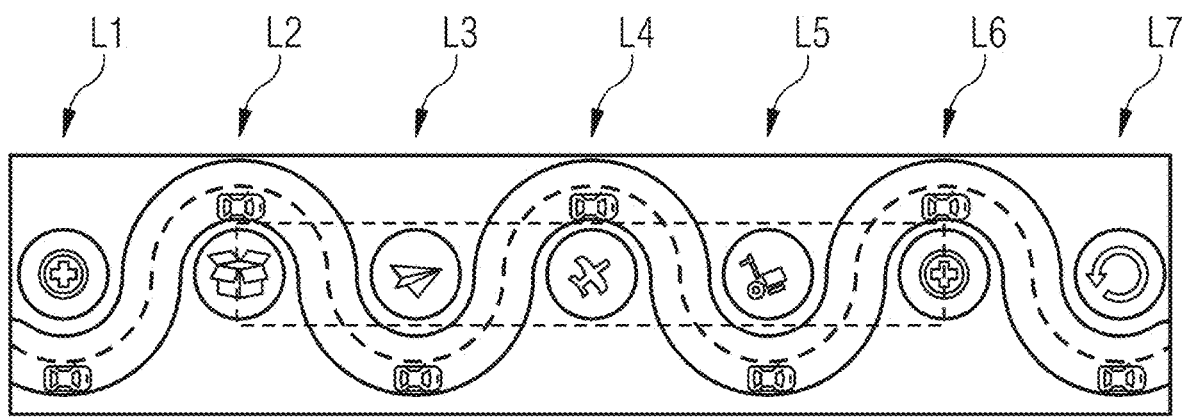
FIG. 1 schematically illustrates a typical transport route for a spare part in service/spare parts logistics.

The above and other elements, features, steps, and concepts of the present disclosure will be more apparent from the following detailed description in accordance with example embodiments of the invention, which will be explained with reference to the accompanying drawings.

Some examples of the present disclosure generally provide for a plurality of circuits, data storages, connections, or electrical devices such as e.g. processors. All references to these entities, or other electrical devices, or the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection, or communication, or coupling between functional blocks, devices, components, or other physical or functional units shown in the drawings or described herein may also be implemented by an indirect connection or coupling. A communication between devices may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above.

Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment is directed to a method, which may be a computer-implemented method, for determining a location of a device.

In at least one embodiment of the method, in a first step, a fingerprint of radio signals, which are received by a device at a location to be determined are obtained. The radio signals may be received by respective antennas of the device. The device may be located at a location, which may not be known, wherein it may be required to determine the location of the device. The location may be an indoor location, e.g. inside a building or may be an outdoor location outside a building. At the location, the device may receive radio signals present at the location, for example by using respective operational units included in the device, such as one or more receivers, or transceivers, or antennas, which may be coupled to respective controllers of the device, for wirelessly receiving radio signals.

In various examples, the radio signals may comprise one or more different radio signals, which may be distinguished e.g. by different frequency bands, and may have one or more different characteristics such as varying signal strengths, maximum and/or minimum signal strengths, temporal course or variation of signal strengths, occurrences of distortions in each signal, and interferences between the radio signals. In other words, analog characteristics and/or digital information may be derived from the radio signals. One or more antennas may be used to receive the radio signals.

The device may generate a fingerprint, which is in other words a data set, of the radio signals. A fingerprint may comprise a subset of the data received by the radio signals. For example, a fingerprint of radio signals may comprise analog or digital information, such as one or more of characteristics of the radio signals, and/or one, or more, or all of the received radio signals. For example, a signal strength, or variation of the signal strength over time, of one or more of the radio signals, may be included in a fingerprint. Additionally, digitally available information or data by one or more of the radio signals, such as a base station ID of the radio signals, may be included in a fingerprint.

In general, obtaining data, e.g. fingerprints or sensor data, may comprise receiving stored data from internal or external memory or data storage, and/or receiving data from a sensor or a computing device, were they the data have been measured, or generated, and/or processed, wherein any known method of transmitting or receiving data may be implemented.

For example, a radio signal may be a signal transmitted using a radio frequency (RF), which is the oscillation rate of an electromagnetic field, for example and without limitation, in the frequency range from around 20 kHz to around 300 GHz, which may alternatively be referred to as roughly between the upper limit of audio frequencies and the lower limit of infrared frequencies. These are frequencies, at which energy from an oscillating current can radiate off a conductor into space as radio waves. Different types of radio signals, such as Wi-Fi signals, Bluetooth signals, GSM signals, and GPS signals, may specify different upper and lower bounds for the frequency range.

In another step, the location of the device is determined by applying trained functions to the fingerprint, which have been trained with training fingerprints, i.e. training data sets, of radio signals received at a plurality of known locations. In other words, determining the location of the device comprises applying trained functions to the fingerprint of the location, wherein applying the trained functions to the fingerprint provides the determined location. Accordingly, a fingerprint may an input to the trained functions, wherein a location may be an output of the trained functions.

Determining the location of the device may comprise determining a plurality of possible locations for the device, wherein each of the possible locations may be associated with a corresponding probability for the device being in this location.

The trained functions for determining a location of a device may have been trained using any method for providing trained functions for determining a location of a device according to the present disclosure.

In general, trained functions mimic cognitive functions that humans associate with other human minds. In particular, by training the functions, or in other words a machine learning model, based on training data sets the trained functions are able to adapt to new circumstances and to detect and extrapolate patterns. Parameters of a trained function may be adapted by means of training. For example, supervised training, semi-supervised training, unsupervised training, reinforcement learning, and/or active learning may be used. Furthermore, representation learning (an alternative term is "feature learning") may be used. In particular, the parameters of the trained functions may be adapted iteratively by several repetitions of a training method.

For example, the trained functions may be end-to-end trained functions, which were trained with a plurality of training data sets. A training data set may include input data associated with reference output data e.g. a fingerprint of radio signals at a known location associated with a location name, or an environmental sensor data set associated with a known health condition. Applying trained functions may be performed by a neural network, which may comprise a plurality of classifier functions.

In various examples, trained functions may comprise one or more of known machine learning classifiers. Without limitation, the trained functions may be based for example on one or more of a support vector machine, a decision tree and/or a Bayesian network, k-means clustering, Q-learning, genetic algorithms and/or association rules. For example, a neural network may be a deep neural network, a convolutional neural network, or a convolutional deep neural network, an adversarial network, a deep adversarial network and/or a generative adversarial network, or a model-based machine-learning network architecture.

In another step, the determined location is provided. For example, a location name or other unique location identifier, such as a room name or a name of a point of interest (POI) may be determined and provided for the location.

The device may further comprise at least one environmental sensor, or a plurality of environmental sensors. The at least one environmental sensor may be included in the device, or may be arranged at the device.

An environmental sensor may be, for example and without limitation, a sensor for measuring acceleration such as shock and vibration, temperature sensor, air pressure sensor, ambient light sensor, radioactive radiation sensor, UV exposure sensor, humidity sensor, optical sensor or any other sensor as known in the art.

The method may further comprise obtaining environmental sensor data of the at least one environmental sensor. In other words, the environmental sensor may perform periodical measurements or continuous measurements of environmental conditions of the environment surrounding the device, which may also be referred to as ambient environment. The measurement signals of the environmental sensors may be read and stored in time intervals, in order to provide a timeline or sequence of measurement data. The measurement data may be transmitted to the backend together with a fingerprint, or may be transmitted to the backend independently from a fingerprint.

Based on the environmental sensor data of the at least one environmental sensor, a health condition may be determined for the device. It will be appreciated that the described techniques can be used for determining a health condition of the device, or of a delivery including the device, or a component being tracked by the device, wherein the component may be included in the delivery, i.e. the health condition may apply to the device and/or equally to a delivery/component tracked with the device.

In other words, using the environmental sensor data, it may be determined, if one or more of a plurality of predetermined health states or health conditions of a delivery and/or a component in the delivery has occurred. Further, determining a health condition may comprise determining a plurality of probable health conditions each associated with a corresponding probability of a component being in this health condition. A health condition may refer to a quality condition of a component, which may be defined, for example and without limitation, as undamaged, light wear, damaged, or unusable. The determined health condition for the device may be provided, for example to the backend or a transportation service provider.

Determining a health condition may comprise applying trained functions to the environmental sensor data, which have been trained with environmental sensor training data of a plurality of devices and known health conditions of the devices. In various examples, trained functions for determining a health condition for a device may be end-to-end trained functions, which have been trained with training data sets. A training data set may comprise a known health condition of a device and corresponding environmental sensor training data, which may be sensor data generated or measured by at least one environmental sensor of the device. The at least one environmental sensor may be attached to or arranged at the device, or may be included in the device.

For example, it would be possible that, over a course of time, a training data set has been created for a plurality of components, each shipped, and tracked with a respective tracking device. Environmental sensor data may have been collected during shipment or transportation of each of the devices. Further, a health condition may have been determined after transportation of the component by inspection or testing of the component. In various examples, the component may have been operated for a period of time, wherein lifetime data for a prognosis of a lifetime of the component, or after component failure, a lifetime of the component has been determined, wherein the health condition may comprise the lifetime of the component. A training data set for providing trained functions for determining a health condition of a component may comprise the environmental sensor data collected during transportation and the corresponding health condition, or lifetime, of the component.

By using the environmental sensor data, it may be possible to predict a health condition of a component after transportation using a tracking technique according to the present disclosure. For example, the environmental sensor data may be used to warn a technician on site, who receives the shipment, that he should carefully inspect the received shipment.

Before a defective spare part, which has been damaged during transport, reaches its destination, a replacement shipment for a new spare part may be initiated on basis of a notification of a damaging event for the shipment. This may minimize the waiting time until a functioning spare part arrives. Liability issues can be solved unambiguously. This ensures traceability and documentation; traceability is done using the location, which can be either outdoors or indoors. The combination of both measuring systems, i.e. GPS and Wi-Fi fingerprinting, may be used for data acquisition.

In addition to tracking of the ambient environment conditions around the device, which may enable a health condition tracking, which may be provided for the shipped device, a lifetime prognosis may be provided.

The environmental sensor data may be used in a machine-learning model to predict a lifetime of materials or components included in the shipment. Using the machine learning techniques, i.e. the trained functions trained with measured shipment conditions and real lifetimes of devices, lifetimes may be more reliably be predicted, and influences on lifetimes may be recognized based on a plurality of ambient conditions of the device during shipment. Preciseness of such a prognosis of a lifetime may increase with the experience from previous shipments of devices over time. For improving future lifetime prognosis of another component, the received environmental sensor data may be stored in a database as input training data for training the trained functions. When, at a later point of time, a component becomes defective and, thus, the lifetime of the component becomes known, the environmental sensor data may be associated with the component and the component lifetime, and may be used to train a machine-learning model to predict a lifetime of a further component.

A method for providing trained functions for determining a location of a device is provided in the following as a separate method, which may be performed independently of the method for determining a location of a device using the trained functions.

At least one embodiment is directed to a method, which may be a computer-implemented method, for providing trained functions for determining a location of a device comprising the following.

In a first step, training fingerprints of radio signals received at a plurality of known locations are received. At each known location, radio signals present at the location may be received, and a fingerprint may be generated of the radio signals, in a similar manner as described for the methods for determining a location of a device.

In another step, for each training fingerprint, a corresponding location is generated. Generating locations for the training fingerprints comprises applying functions, or trainable functions, to the training fingerprints, whereby the locations are generated.

In another step, a difference between the generated locations for the devices and the known locations of the devices is determined. A difference may be generated between a generated location and a known location for each device and based thereon a difference may be determined as an overall difference.

In another step, the functions are trained based on the determined difference, or in other words using the determined difference. Training functions may comprise adapting parameters in the functions in such a way, that the difference is minimized.

In another step, the trained functions for determining a location of a device are provided.

For example, receiving training fingerprints may comprise moving a device to each of a plurality of known locations, wherein at each known location the device scans for radio signals, i.e. receives radio signals present at the location, and generates a fingerprint of the radio signals at each location. Further, the device may provide the fingerprints of each known location as a training data set for machine learning functions. For example, a location name may be provided for each location, wherein the fingerprint may be associated with the known location and/or the location name, so as to form the training fingerprint for training the machine learning model for determining a location of a device.

A computer-implemented method for providing trained functions for determining a health condition of a device comprises the following steps.

In a first step, environmental sensor training data of each of a plurality of devices is received. Each device comprises at least one environmental sensor and a component tracked with the device in a known health condition after being exposed to the environmental conditions measured by the sensors during transportation.

In another step, functions are applied to the environmental sensor training data, wherein, for each device, a health condition is generated. For example, as in other methods for providing trained functions according to the present disclosure, trained functions may be end-to-end trainable functions. By applying the trainable functions to the environmental sensor training data of the plurality of devices, a health condition for each of the devices is generated as an output.

In another step, a difference is determined between the generated health conditions and the known health conditions the components. Specifically a difference may be determined pairwise be between a generated health condition and a known health condition for each of devices, wherein total difference is determined based on the pairwise determined differences.

In another step, the trainable functions are trained based on the determined difference.

In another step, the trained functions for determining a health condition of a component are provided.

The techniques according to the present disclosure may have the following advantages. No infrastructure system has to be built, which would be connected with enormous costs and a high expenditure, in particular for a building owner.

The techniques may provide increased location accuracy, as the location and condition of the shipment may be specified more precisely than is possible with conventional methods (e.g. GPS). Here, the artificial intelligence of the Wi-Fi fingerprinting techniques according to the present disclosure using machine learning provides a significant improvement to indoor localization, by being able to efficiently process any information from the input radio signals, including e.g. weaker radio signals, or even interferences and disturbances.

Precise indoor localization may be performed using analog and digital information of radio signals using an AI engine, which processes and filters radio signal data and environmental sensor data. The determined location may be specified using existing room numbers and names of the building. Further, damage to shipments may be identified more quickly.

The techniques according to the present disclosure may be applied other areas outside service logistics and may, using further interfaces, solve a wide range of problems associated with e.g. warehouse logistics or, more general, material flow at end customers, such as hospitals or other institutions.

Not only can delivery delays be detected, optimized delivery routes may be provided in the future and possible problems over the lifetime of components may be predicted in advance. With the help of transport route optimization, costs can be saved thanks to perfected time management. In addition, this may result in an increased effectiveness, considering e.g. the case of a technician in a hospital, because the knowledge from precise location tracking can be used for improved resource planning. In addition, all the advantages listed achieve high satisfaction at the end customer, which may benefit relations with contractual partners.

A computing device is configured for determining a location of a field device and comprises a memory, an interface, and at least one processing unit, the memory containing instructions executable by said at least one processing unit, wherein execution of the instructions causes the computing device to perform the following steps.

In a first step, a fingerprint of radio signals received by the field device at a location to be determined are obtained by the computing device. In another step, the computing device determines the location of the field device by applying trained functions to the fingerprint, wherein the trained functions were trained with training fingerprints of radio signals received at a plurality of known locations. In another step, the computing device provides the determined location.

The computing device may be further configured to execute the steps of any method or any combinations of methods according to the present disclosure.

A system, or tracking system, is configured to perform any method for determining a location of a field device using trained functions, or providing trained functions for determining a location of a field device, according to the present disclosure. The system comprises at least one computing device and at least one field device according to the present disclosure.

A computer program product and a computer-readable storage medium comprise program code to be executed by at least one processor of a computing device. Therein, the execution of the program code in the at least one processor causes the computing device to carry out one of the methods for providing trained functions for determining a location of a device, or for determining a location of a device using trained functions, according to the present disclosure.

For such a computing device, tracking system, computer program product, and computer-readable storage medium for determining a location of a device using trained functions and for providing trained functions for determining a location of a device, technical effects may be achieved, which correspond to the technical effects described for the methods for determining a location of a device using trained functions, and for providing trained functions for determining a location of a device, according to the present disclosure.

Although specific features described above and in the following detailed description are described in connection with specific examples, it is to be understood that the features may not only be used in the respective combinations, but may also be used isolated, and features from different examples may be combined with each other, and correlate to each other, unless specifically noted otherwise.

Therefore, the above summary and description is merely intended to give a short overview over some features of some embodiments and implementations and is not to be construed as limiting. Other embodiments may comprise other features than the ones explained above.

Hereinafter, techniques are described that may facilitate monitoring and localization of a shipment, specifically inside buildings, in the field of supply chain logistics.

FIG. 1 schematically illustrates a typical transport route for a spare part in service/spare parts logistics.

Referring to FIG. 1, transportation of a replacement CT tube to a hospital is depicted. It is to be appreciated that similar principles and problems may apply e.g. to any material flow, for example transportation of components to or in industrial production lines.

In step L1, a CT tube becomes defective in a hospital. In step L2, spare, i.e. replacement, CT tube is packed at a supplier for transportation to the hospital. In step L3, the spare CT tube is transported to the airport. In step L4, the spare CT tube is transported by plane. In step L5, the spare CT tube is delivered a distributor, who will deliver and hand over the spare CT tube to the hospital. In step L6, the replacement CT tube is installed at the hospital by a technician of the CT tube supplier replacing the defective CT tube. In step L7, the defective CT tube may be returned to the supplier in a reverse direction of the logistical path.

As indicated by the dotted box in FIG. 1, after packing the replacement CT tube at the supplier and handing it to a first transportation service provider, and up to receiving the spare tube by a technician of the supplier on site in the hospital, no exact information is known, where the spare CT tube is located, and in which environmental conditions it is situated. In this regard, the logistical path between step L20 and L60 may be regarded as a black box, wherein only sparse information may be made available by transportation service providers.

Several problems may be associated with the above described supply chain logistics. The transparency on transport routes of service/spare parts logistics may be unreliable or missing completely. For example, it may not be possible to see where a shipment is located, nor the condition of the goods within a shipment. Consequently, the status of the parcel may be unknown, wherein neither a condition of a spare part, e.g. a damage, nor the exact location of the shipment may be known.

Further, shipments inside buildings are hard to find. A technician, who depends and waits on the shipment, may not know when the device is available on site for installation, or may not know in which exact room, or even building, of the hospital the shipment has been received and is stored. Accordingly, the technician may need a lot of time to determine the exact location, e.g. room, of a parcel inside a building, which increases service costs for the hospital.

Such a typical supply chain may include a plurality, in some examples up to twenty-six different logistics service providers, wherein, in particular, the handover at the hospital and storage in the hospital may often not be clearly defined. Accordingly, the necessary spare part may be in an unknown location inside a building.

Furthermore, loss and damage of shipments may occur during shipment from a supplier to the hospital. For example, a defective spare part may arrive at the hospital (i.e. end customer), wherein a loss or damage has occurred on the way there.

This may require follow-up clarifications, e.g. a guarantee of a responsible party, i.e. liability, may have to be determined. Furthermore, an alternative shipment may only take place after it is known that the package has arrived at its destination defective, but not at the earliest possible time, which is the occurrence of the damage/or loss. In consequence, extended downtimes may occur impairing the customer's satisfaction. For example, a hospital or a physician may have increased machine costs due to a medical device's downtime and increased technician working hours.

To date, some of the problems have been solved by making suppliers and service providers provide information on the location and delivery of shipments (provision of shipment data, e.g. via EDI). In the past, these statements unfortunately proved to be unreliable and untransparent.

Existing solutions on the market for tracking parcels and shipments use a wide variety of sensors. Using GPS it is possible to track shipments outdoors and obtain an approximate time of arrival. Various transportation service providers offer shipment tracking on their homepage or via application. However, such a solution for the inside of buildings, e.g. inside tracking, is not available.

Figure 2:
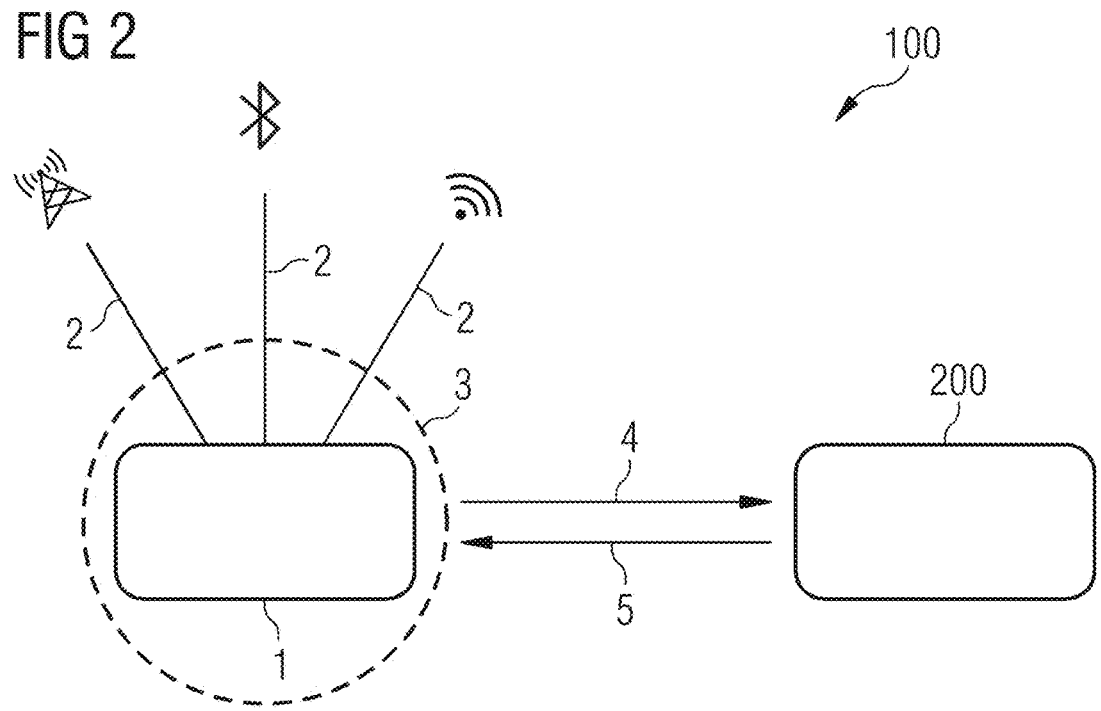
FIG. 2 schematically illustrates a tracking system for determining a location of a field device using trained functions, according to embodiments of the invention.

FIG. 2 schematically illustrates a tracking system 100 for determining a location of a device 1 using trained functions, according to embodiments of the invention.

As depicted in FIG. 2, tracking system comprises a field device 1, which may be referred to as a frontend of the tracking system, and which is located at a location 3 to be determined. The field device 1 it is exposed to various radio signals at the location 3, which, in this example comprise one or more GSM signals 2 from one or more cellular network base stations, or in general radio signals used for mobile communication in a cellphone network, one or more Bluetooth signals 2, and one or more Wi-Fi signals from one or more Wi-Fi base stations. The device 1 is in communication with a computing device 200, which may also be referred as a backend of the tracking system 100.

Referring to FIG. 2, machine learning functionality according to the present invention will be explained in more detail. By combining different radio signals 2 (e.g. Wi-Fi, Bluetooth and GPS/GSM), a room-based localization of a shipment may be provided using a tracking device 1. In the context of the present disclosure, a tracker may equally be referred to as tracking device, field device, or device. Therein, the tracker may for example be attached to or comprised in a shipment, e.g. a spare part, or a parcel.

Radio signals at a certain location 3 may comprise information, e.g. signal strengths and base station IDs of Wi-Fi signals, which are received by the device 1, and further are transmitted from the device 1 to a computing device 200 providing an AI engine as a fingerprint 4 of the radio signals 2 at the location 3. The AI engine provided at the backend by a computing device 200 enables an analyzing functionality using machine learning for the fingerprint 4, i.e. applies trained functions to the fingerprint 4 and is able to train the functions using training fingerprints with associated known locations. By applying the trained functions to the fingerprint 4, the location 3 of the field device 1 is be determined.

The fingerprint 4 transmitted to the AI-Engine comprises a list of the found radio signals 2, the corresponding signal strength for each signal, and optionally GPS coordinates of the device at the current location 3.

Using GPS coordinates, the tracking device 1 may pre-select probable locations of the parcel within a building. A known or determined location may be represented by a location name 5 e.g. by an address and/or a room number or name within a building. The determined location name 5 is transmitted to the field device 1.

In a training process for training the functions, the premises must be scanned in advance and so training fingerprints must be set for known locations. For example, these fingerprints may be scanned and stored by a technician using a mobile app, and then may be provided to the backend together with names for the locations, in order to provide the training data sets for training the functions for providing a location of a device.

In such a way, a virtual infrastructure is created using the AI engine, that later may provide precise information about the position of a parcel. Therein, the AI engine uses a fingerprint 4, including signal strengths and base station IDs of radio signals 2, and applies the trained functions to the fingerprint 4, in order to generate at least one location. It then provides probabilities for the nearest fingerprints, i.e. locations associated with known fingerprints, and, in such a way, discloses where the packet is.

With GPS coordinates a preselection may be made, which helps to ensure the scalability of our solution. For example, when it was recognized, that the parcel was transported to a city in Germany, using outdoor tracking with GPS, only a subset of relevant fingerprints, which are located in the respective city in Germany, will be used by the AI engine. The AI engine uses at least one machine learning function, or classifier, as known in the art, such as e.g. SVM and/or a neural network. In various examples, the AI engine uses a plurality of machine learning functions, e.g. seven or more machine learning functions in a layered network architecture.

In the following, the machine learning functionality will be described in further detail.

A technician is located at a point of interest (POI) inside a building, and uses a button called "Add POI" in his APP. After pressing, the radio signals in the present location are scanned and transmitted to a backend structure, which may include the AI engine. Further, the technician enters a suitable and detailed room name associated with the present location. The POI is named by this name to enable the exact location later. In other words, a training fingerprint is generated, which includes a fingerprint of the radio signals at a location and a location name. The training fingerprint is stored in backend, together with a plurality of further training fingerprints associated with different POIs, and the learning process of the AI may be initiated, i.e. a machine learning model may be generated or trained using the training fingerprints.

Using the trained functions, which were trained with fingerprints of known locations, packages can then be located. Therein, the tracker works as described in the following. The tracker scans the radio signals of its environment, the data are queried by the backend of the AI engine to find out the location and then display it for the technician in the app.

In order to reduce the amount of data to be compared, the fingerprints may be grouped into families. These families may be grouped and/or selected based on their GPS coordinates.

Figure 3:
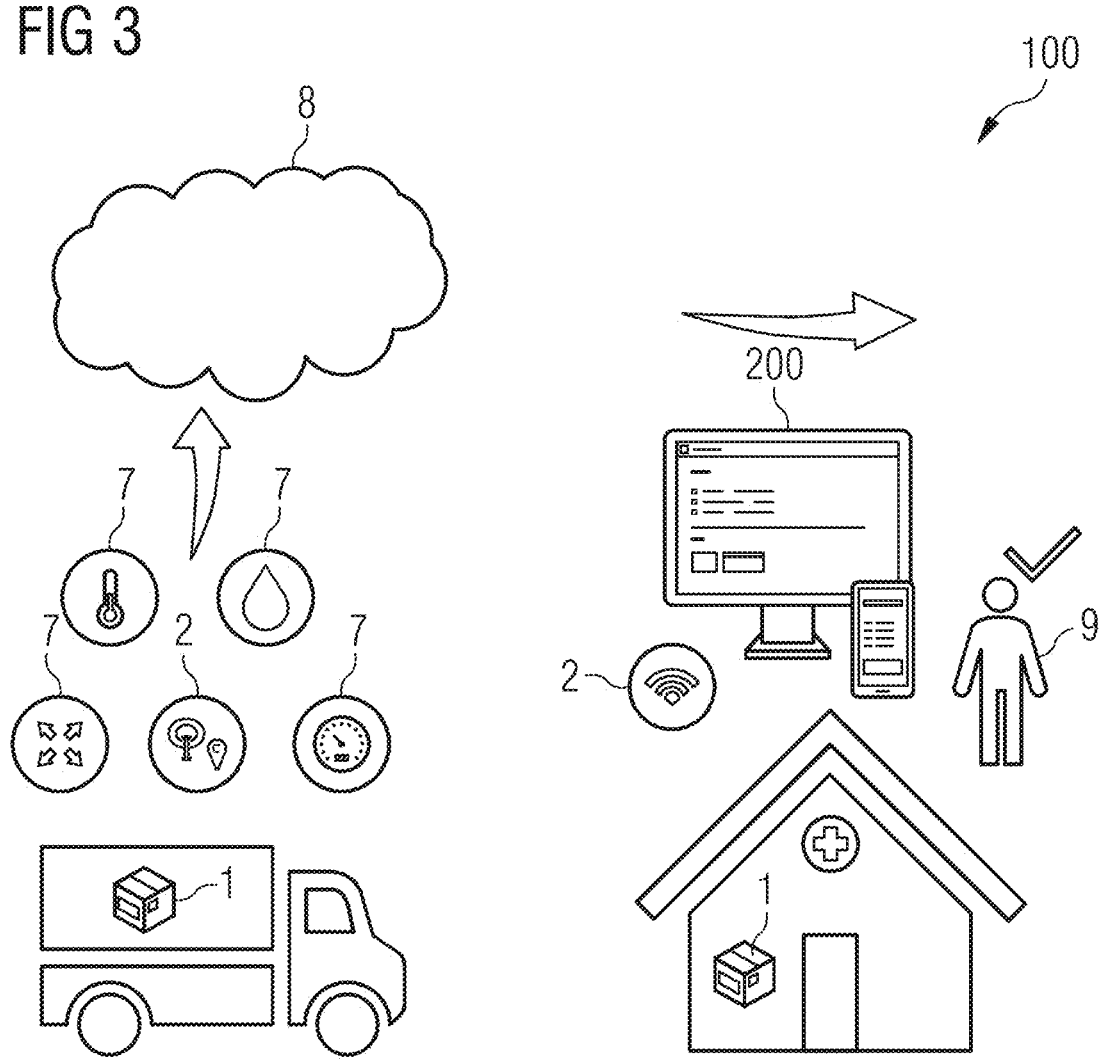
FIG. 3 schematically illustrates a combined outdoor and indoor tracking system with health tracking, according to embodiments of the invention.

FIG. 3 schematically illustrates a combined outdoor and indoor tracking system 100 with health tracking, according to embodiments of the invention.

A shipment comprises a parcel with a tracking device 1, which is transported and delivered into a hospital. The tracking device 1 comprises a plurality of environmental sensors 7 including a temperature sensor 7, a humidity sensor 7, an acceleration sensor 7, and an air pressure sensor 7. The tracking device 1 further comprises at least one receiver for receiving radio signals 2.

The tracking device may be used with a shipment or delivery, in order to trace a service or spare part during transportation.

Outdoor tracking may be provided via GPS with transmission via GSS. During outdoor transportation, the tracking device 1 generates a fingerprint from the radio signals received at locations. Further, the tracking device 1 collects measurement data of the environmental sensors 7.

Indoor tracking may be provided via Wi-Fi by setting points of interest (PO's) using a so-called Wi-Fi fingerprinting process based on end-to-end trained machine learning functions. When the shipment has been delivered to the hospital, and is transported and stored inside the hospital building, the tracking device collects fingerprints of radio signals comprising Wi-Fi signals 2. In such a way, a virtual infrastructure is created within buildings using artificial intelligence.

Using the environmental sensors 7, shock and vibration, i.e. acceleration sensor limit violations, temperature limit violations, air pressure violations, etc. are detected and transmitted to the application, which may further transmit the data to the backend.

In time intervals, the tracking device 1 transmits the fingerprints and the collected environmental sensor data to a data base, or cloud data storage 8. The data stored in cloud storage 8 is used by a computing device 200 to determine a location of the tracking device 1 for each fingerprint. Further, a health condition of the parcel is determined based on the environmental sensor 7 data.

As depicted in FIG. 3, the techniques according to the present disclosure provide not only location data for outdoor use, but also provide accurate location data for indoor use using various sensors and machine learning, will be described in further detail.

Using the determined locations of the tracking device 1, displayed e.g. as a timeline of locations to a technician 9, the technician may be able to easily find the shipment inside the hospital building. Therein, an application, which may be an application of a mobile electrical device may visualize localization and location to a user, e.g. a technician 9. Further, the application may provide configuration options of various kinds for the user.

By storing events that occur on the freight route e.g. on the tracker's memory card, liability issues can be solved unambiguously. This ensures traceability and documentation; traceability is done using the location, which can be either outdoors or indoors. The combination of both measuring systems, i.e. GPS and Wi-Fi fingerprinting, may be used for data acquisition.

Before a defective spare part, which has been damaged during transport, reaches its destination, a replacement shipment for a new spare part can be initiated on basis of a notification of a damaging event for the shipment. This may minimize the waiting time until a functioning spare part arrives.

The techniques according to the present disclosure may have the following advantages. No infrastructure system has to be built, which would be connected with enormous costs and a high expenditure, in particular for a building owner.

The techniques may provide increased location accuracy, as the location and condition of the shipment may be specified more precisely than is possible with conventional methods (e.g. GPS). Here, the artificial intelligence of the Wi-Fi fingerprinting techniques according to the present disclosure using machine learning provides a significant improvement to indoor localization.

Precise indoor localization may be performed using analog and digital information of radio signals 2 using an AI engine, which processes and filters the obtained data. The determined location may be specified using existing room numbers and names of the building. Further, damage to shipments may be identified more quickly and precisely using the data of environmental sensors 7.

In various examples, fingerprinting may refer generating a fingerprint of radio signals from Wi-Fi, Bluetooth and GSM receivers, and/or environmental sensor signals.

The fingerprints may be transmitted by a communication structure of cloud storage, which may be chosen independently from the transportation service providers, which leads to full data sovereignty of the supplier and/or the end customer.

The techniques according to the present disclosure may be applied other areas outside service logistics and may, using further interfaces, solve a wide range of problems associated with e.g. warehouse logistics or, more general, material flow at end customers, such as hospitals or other institutions.

Not only can delivery delays be detected, but the storage of the fingerprints and the use of artificial intelligence, in particular machine learning, may provide optimized delivery routes in the future and predict possible problems over the lifetime of components in advance. With the help of transport route optimization, costs can be saved thanks to perfected time management. In addition, this may result in an increased effectiveness, considering e.g. the case of a technician in a hospital, because the knowledge from precise location tracking can be used for improved resource planning. In addition, all the advantages listed achieve high satisfaction at the end customer, which may benefit relations with contractual partners.

For example, neural networks and support vector machines may be deployed for processing the fingerprints. For example, sequence qualification algorithms such as LSTM may be deployed for analysis of the sensor data.

A tracking system 100 according to the present disclosure may include a frontend with one or more tracking devices 1 transmitting fingerprints 4 to a backend, the backend including least one computing device 200 for performing the machine learning functions. Further, a web application and/or a desktop application may be provided for displaying and providing the information and functionality, i.e. application views, to a technician.

In the following, application views according to embodiments of the present invention will be explained in further detail.

A front-end part for outdoor/indoor localization may display a manager view. Data is sent by the tracker to the AI engine with a database, and location data received from the AI engine, and is represented for outdoor localization.

An overview map may be displayed, which has a pointer, and indicates the current location of the tracker and an accuracy of the current location by indication of a circle around the location. Updates are made whenever the tracker sends updated information about its location.

A location history map may be displayed, which contains all the locations, where tracker has been and sent data, which may be presented as pointers with accuracy circles around, connected with lines indicating movement from point to another. On mouse over, coordinates and various sensors information like temperature, humidity, etc., are displayed.

In an indoor localization, view multiple columns may be displayed including the POIs (points of interest, which may comprise name of the location inside any facility), probabilities (of the tracker being in this exact location) in percentage, and timestamps.

The front-end part for outdoor/indoor localization may display a technician view, which will be described in the following.

Data is sent by the tracker to the AI engine with a database, and location data is received from the AI engine and is represented for outdoor localization.

An overview map may be displayed, which has pointer, which indicates current location of the tracker and an accuracy circle around. Updates are displayed whenever the tracker sends updated information about its location.

In an indoor localization view, a plurality of columns may be displayed including the POIs (points of interest, which would be name of the location inside any facility), probabilities (of the tracker being in this exact location) in percentage, and timestamps.

An "Add POI" functionality may be presented only in a mobile application. A technician writes the name of the indoor location and application starts scanning the indoor location for radio signals, creating a fingerprint of this location. Later, if the tracker will be inside this location, probability of being inside this POI will be shown in the indoor localization view.

Referring back to FIG. 3, a combination of an outdoor/indoor tracking system with Wi-Fi fingerprinting technology as a specific method for indoor tracking is provided. Therein, outdoor tracking, or outdoor localization, may be provided with exact localization determined by GPS and sent via GSM, wherein data sending may be individually set. Further, indoor localization is provided, wherein the second location in buildings is found using Wi-Fi fingerprinting without setting up an expensive and complex infrastructure. Indoor tracking via Wi-Fi fingerprinting is enabled by a machine learning system.

Furthermore, health or condition tracking may be provided, wherein the real-time tracking of events may be performed using a plurality of environmental sensors. The measurement data of the environmental sensors may be analyzed and further processed using the AI system. The measurement data may be included in the fingerprints and training fingerprints for the machine learning functions. In particular, certain events, i.e. faults or damaging incidents may be trained by machine learning functions and may be predicted by the trained machine learning functions. For example, prognosis of a lifetime of spare part may be provided using the trained machine learning functions. Thus, early detection of possible damages may be provided. A total ownership of data, which can be used for a machine learning system, such as information about products, transport, logistics network/supply chain, and/or packaging, may be obtained, wherein such data may be used for training machine learning functions for the above predictions and prognosis. In such a way, the techniques according to the present invention may combine the three components Outdoor, Indoor and Health/Condition Tracking.

Figure 4:
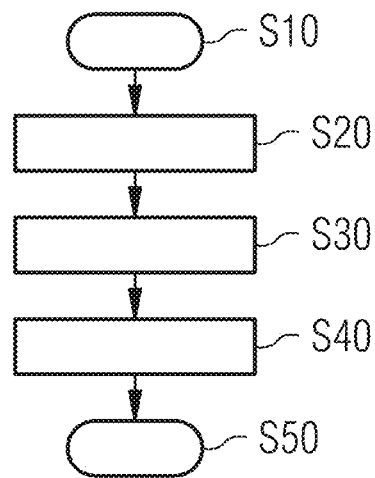
FIG. 4 illustrates a flow chart of a method for determining a location of a device using trained functions, according to embodiments of the invention.

FIG. 4 illustrates a flow chart of a method for determining a location of a device 1 using trained functions, according to embodiments of the invention.

The computer-implemented method for determining a location of a device starts in step S10. In step S20, a fingerprint of radio signals received by the device at a location to be determined is obtained. In step S30, the location of the device is determined by applying trained functions to the fingerprint, which were trained with training fingerprints of radio signals received at a plurality of known locations. In step S40, the determined location is provided. The method ends in step S50.

Figure 5:
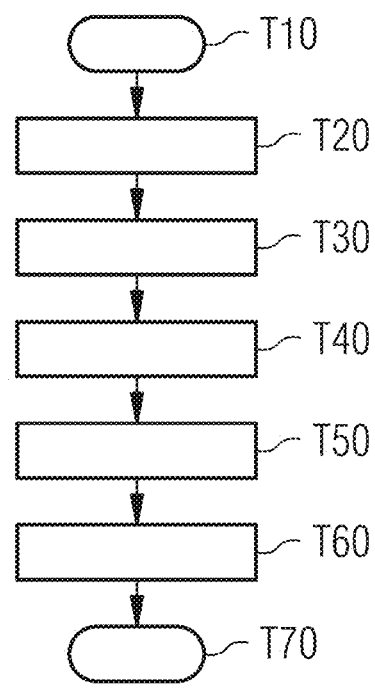
FIG. 5 illustrates a flow chart of a method for providing trained functions for determining a location of a device, according to embodiments of the invention.

FIG. 5 illustrates a flow chart of a method for providing trained functions for determining a location 3 of a device 1, according to embodiments of the invention.

The computer-implemented method for providing trained functions for determining a location of a device starts in step T10. In step T20, training fingerprints are received, wherein each training fingerprint is a fingerprint of radio signals received at a known location. The training fingerprints may be obtained together with or associated with the known locations, e.g. location names. In step T30, functions, which may be end-to-end trainable functions, are applied to the training fingerprints, wherein for each training fingerprint a corresponding location is generated and output. In step T40, a difference is determined between the generated locations and the known locations. Generating a difference may comprise generated difference based on a distance between a generated location and the corresponding known location of a fingerprint. In step T50, the functions are trained based on the determined difference. In step T60, the trained functions for determining a location of a device are provided. The method ends in step T70.

Steps T30, T40, and T50 refer to a learning phase, or in other words a training phase of the trained functions, which may be iterated, in order to train the functions, or when new training data sets are available. In an application phase, the trained functions, which were trained in the learning phase, are applied to a fingerprint of an unknown location to be determined.

Figure 6:
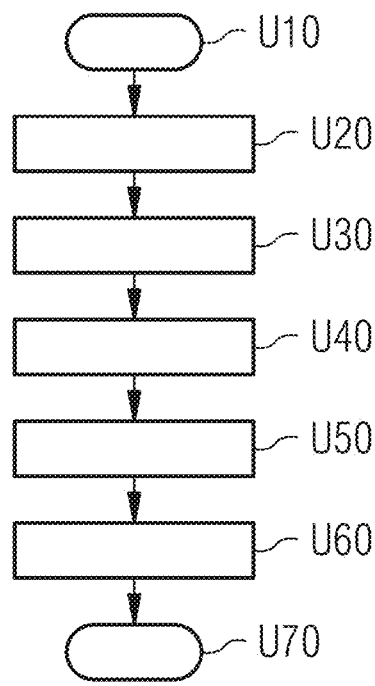
FIG. 6 illustrates a flow chart of a method for providing trained functions for determining a health condition of a component, according to embodiments of the invention.

FIG. 6 illustrates a flow chart of a method for providing trained functions for determining a health condition of a component, according to embodiments of the invention.

The method for providing trained functions for determining a health condition of a component starts in step U10. In step U20, environmental sensor training data is received. The environmental sensor training data comprises environmental sensor data of each of a plurality of devices, associated with a known health condition of a component tracked with the device. Each device may comprise at least one environmental sensor. In step U30, trainable functions are applied to the environmental sensor training data, wherein for each device a health condition is generated. In step U40, a difference between the generated health conditions and the known health condition of the components is determined. The difference may be determined, wherein for each device the generated health condition is compared to the known health condition of the respective component. In step U50, the trainable functions are trained based on the determined difference. In step U60, the trained functions for determining a health condition of a component are provided. The method ends in step U70.

Figure 7:
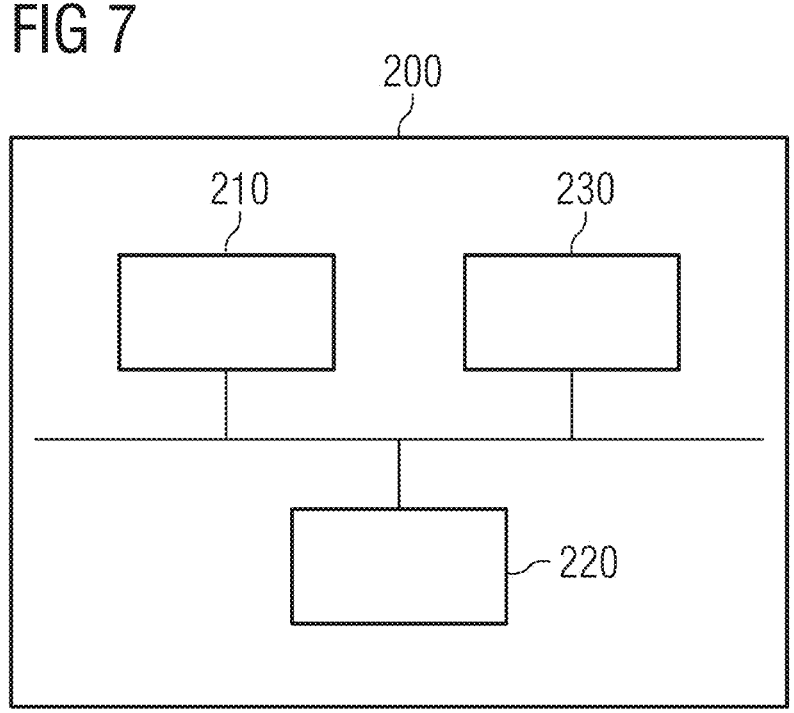
FIG. 7 illustrates a schematic drawing of a computing device configured for determining a location of a field device using trained functions, according to embodiments of the invention.

FIG. 7 illustrates a schematic drawing of a computing device 200 for determining a location of a field device 1 using trained functions, according to embodiments of the invention.

The device, or computing device, 200 is configured for localization of a field device and/or for providing trained functions for localization of a field device, wherein the computing device 200 comprises a memory 230, an interface 220, and at least one processing unit 610. Therein, the memory 230 contains instructions executable by said at least one processing unit 610, wherein execution of the instructions causes the computing device 200 to execute the steps according to the method described for FIG. 4 and FIG. 5.

From the above said, some general conclusions may be drawn:

The techniques according to embodiments of the invention may provide combined indoor and outdoor tracking of a shipment. Indoor tracking may be provided by an advanced Wi-Fi fingerprinting or sniffing technique using machine learning, which has an improved accuracy and is able to differentiate more precisely between a plurality of locations than traditional indoor tracking systems.

For example, it would be possible that the trained functions for determining a location of a device are applied and trained with data sets including a fingerprint of radio signals and at least one or all of the environmental sensor data. For example, it would be possible that the trained functions for providing a health condition of a component is applied and trained with data sets including the radio signal fingerprints that are generated by the device during transportation. For example, it would be possible, that a fingerprint is a fingerprint of the radio signals received by the device and at least one environmental sensor signal of the device.

Additional information in the data sets for machine learning models may further advance preciseness of the output of the machine-learning model.

Referring back to the localization techniques, applying trained functions to a fingerprint may include applying at least one classification algorithm to the fingerprint, which may be a machine learning classifier. Applying trained functions may be performed using a neural network. For example, trained functions may be machine-learned classifiers applied to a dataset in a plurality of layers in a neural network.

In various examples, the radio signals may comprise a plurality of different Wi-Fi signals, i.e. signals of various Wi-Fi base stations, wherein the fingerprint includes a signal strength and or a base station ID of each of the Wi-Fi base stations.

The radio signals may include at least two different types of radio signals, wherein a type of radio signals may refer to a Wi-Fi type radio signal according to e.g. an IEEE 802.11x industry standard, or a Bluetooth type radio signal, or a Global System for Mobile Communications (GSM) type radio signal, or a Global Positioning System (GPS) type signal.

The method for determining a location of a device may further comprise obtaining a GPS signal from the device, and preselecting locations, which can be determined by the trained functions, based on the GPS signal. When it can be determined, based on the GPS signals, that the device is located near a destination in a certain country, or city, or building, a machine learning algorithm for determining a location may be configured, based on the GPS signals, to only output locations that match the location or a range from the location determined based on the GPS signals. For example, only locations or rooms may preselected for output, which are in a certain building.

The methods for determining a location of a device may be performed a plurality of times for the device during transportation. For each determination, a determined location of the device may be stored associated with a corresponding timestamp in a database. Using a timeline of locations, where the device has passed through, a device may be found by a person, even if the last location of the device may not reliably be determined, for example by starting a search from the last determined location.

Specifically, the locations and the known locations in training data sets may be indoor locations, for example inside a building, which are each associated with a unique location name. The method according to the invention may advantageously provide indoor tracking inside a building, where the preciseness of the location is increased compared to traditional Wi-Fi fingerprinting techniques.

In other words, the trained functions may be trained with a number of points of interest, or significant locations, in a building. When, in an application phase of the trained functions, no location can be determined with a high probability for device, it may be possible that a timeline in of earlier locations is stored for the device, and may be used by the technician to trace the way of the shipment through a building and to find the shipment. For example, it would be possible that the trained functions determine a plurality of possible locations and then interpolate between the locations, in order to determine a single location for the device.

It would be possible, that the field device itself determines its location using the disclosed machine learning techniques.

For example, radio signals may be strong signals, which include digital information such as a sender ID, or radio signals can be any other signal, which does not include digital information, and which traditionally cannot be used for localization, such as interfering signals, weak or single signals, intermitting signals, impulse-like or interrupted signals, Bluetooth signals, and even environmental sensor signals may be included in a fingerprint and training fingerprints, which improve preciseness of the localization by the machine learning techniques.

A fingerprint may correspond to particular location, in that the radio signals and/or environmental sensor signals were received and/or measured at the particular location. For example, it would be possible that at least one non-radio signal, such as a sensor signal by an environmental sensor may be included in the fingerprint, and used by the trained functions to improve the localization.

A movable device, in other words field device or tracking device, may be referred to as frontend or frontend part of a tracking system. A computing device and/or database, which is remote from the tracking device, and which wirelessly receives input fingerprints from the tracking device and determines and/or stores the location and/or health condition of a shipment comprising the tracking device may be referred to as backend or backend part of the tracking system.

The radio signals in the fingerprint may be received by the device at a location to be determined. In other words, the device is in a location, wherein the location is not known, and it is to be determined in which location the device is.

The trained functions may be trained with a plurality of training fingerprints from known locations, wherein each training fingerprint may include data measured or received at a single location of the plurality of known locations, and may thus be associated with the known location. Thus, as known in the art, the trained functions may be end-to-end trained functions. Therein, the fingerprint may be referred to as input dataset, and the location may be referred to as output dataset of the trained functions or machine-learning model.

Determining the location of the device may comprise determining a plurality of probable locations for the device, and determining a probability for each location, that the device is in the location, such that each location is associated with a probability for the device to be in the respective location. The method may further comprise displaying a list of the probable locations together with the respective probabilities to a user.

A fingerprint or fingerprint may include a subset of available information from the radio signals in an analog and digital way, such as presence and signal strength of interfering signals, frequency or latency or channels of each signal.

An indoor location name may be e.g. a room name or a room number of a building.

Summarizing, a computer-implemented method for determining a location of a tracking device is provided, wherein machine-learning functionality may be used to more precisely predict a location of the tracking device inside a building. For example, the indoor tracking method and system may quickly lead a technician to a delivered a shipment inside a building. Further, machine-learning functionality may be advantageously used to alert the technician of quality risks and to predict a lifetime of a transported spare part.

Thereby, the techniques according to the present disclosure may enable combining the use of outdoor and indoor location data compiled by Wi-Fi fingerprinting and AI sensor data fetching using smart tracking devices.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

Although the invention has been illustrated in greater detail using the example embodiments, the invention is not limited by the disclosed examples, and a person skilled in the art can derive other variations therefrom without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for determining a location of a device, comprising:
    obtaining a fingerprint of radio signals including interferences between the radio signals received by the device at a location to be determined;
    determining the location of the device by applying trained functions to the fingerprint obtained, the trained functions being trained with training fingerprints of radio signals received at a plurality of known locations, wherein the applying the trained functions to the fingerprint includes applying at least one machine-learning classification algorithm to the fingerprint by a neural network;
    providing the location determined;
    obtaining environmental sensor data of at least one environmental sensor;
    determining a health condition for the device using the environmental sensor data obtained; and
    providing the health condition determined.

2. The method of claim 1, wherein determining the health condition for the device comprises:
    applying trained functions to the environmental sensor data obtained, the trained functions being trained with environmental sensor training data of a plurality of devices with known health conditions.

3. The method of claim 2, wherein the health condition comprises a lifetime of a component tracked with the device.

4. The method of claim 1, wherein the health condition comprises a lifetime of a component tracked with the device.

5. The method of claim 1, wherein the radio signals include a plurality of Wi-Fi signals and wherein the fingerprint includes at least one of a signal strength and a base station ID of each of the Wi-Fi signals.

6. The method of claim 1, wherein the radio signals include at least two different types of radio signals, selected from Wi-Fi signals, Bluetooth signals, GSM signals, and GPS signals.

7. The method of claim 1, wherein the fingerprint is a fingerprint of the radio signals and at least one signal of an environmental sensor arranged at the device.

8. The method of claim 1, further comprising:
    obtaining a GPS signal from the device; and
    preselecting locations, determinable by the trained functions, based on the GPS signal obtained.

9. The method of claim 1, wherein the method is carried out at several points in time, wherein each respective determined location of the device, at each of the several points in time, is respectively associated and stored with a corresponding timestamp.

10. The method of claim 1, wherein the known locations are locations inside a building, each associated with a unique location name.

11. A computing device for localization of a field device configured to perform the method of claim 1.

12. The method of claim 1, further comprising:
obtaining a GPS signal from the device; and
preselecting locations, determinable by the trained functions, based on the GPS signal.

13. A computer-implemented method for providing trained functions for determining a location of a device, comprising:
receiving training fingerprints of radio signals including interferences between the radio signals received at a plurality of known locations;
applying first functions to the training fingerprints received, wherein for each respective training fingerprint of the training fingerprints received, a respective location is generated, wherein the applying first functions to the training fingerprints includes applying a neural network to the training fingerprints as a training set to implement at least one machine-learning classification algorithm;
determining a difference between the respective locations generated and the known locations;
training the first functions based on the difference determined;
providing the trained first functions for determining the location of the device;
receiving environmental sensor training data of each of a plurality of devices;
applying second functions to the environmental sensor training data, wherein, for each device, a health condition is generated;
determining a difference between the generated health conditions and known health conditions of components;
training second functions based on the determined difference; and
providing the trained second functions for determining the health condition of a component.

14. The method of claim 13, wherein the receiving of the training fingerprints comprises:
moving the device to each of a plurality of locations;
scanning for radio signals at each respective location of the plurality of locations, and generating a respective training fingerprint of the radio signals for each respective location; and
providing a respective location name for each respective location.

15. A computing device configured for localization of a field device, the computing device comprising:
a memory;
an interface; and
at least one processor, the memory storing instructions executable by the at least one processor, wherein execution of the instructions causes the computing device to execute at least:
obtaining a fingerprint of radio signals including interferences between the radio signals received by the field device at a location to be determined;
determining the location of the field device by applying trained functions to the fingerprint obtained, the trained functions being with training fingerprints of radio signals received at a plurality of known locations, wherein the applying of the trained functions to the fingerprint includes applying at least one machine-learning classification algorithm to the fingerprint by a neural network;
providing the location determined;
obtaining environmental sensor data of at least one environmental sensor;
determining a health condition for the device using the environmental sensor data obtained; and
providing the health condition determined.

16. A tracking system comprising:
at least one field device; and
at least one computing device including the computing device of claim 15.

* * * * *